United States Patent [19]
Dusanek

[11] 3,936,874
[45] Feb. 3, 1976

[54] MULTI-FORMAT TAPE DUPLICATOR

[75] Inventor: Norman G. Dusanek, Tarzana, Calif.

[73] Assignee: Glen Miller, Panorama City, Calif.

[22] Filed: Oct. 11, 1973

[21] Appl. No.: 405,672

[52] U.S. Cl. .................... 360/15; 360/92; 360/94
[51] Int. Cl.² .......................................... G11B 5/86
[58] Field of Search ............. 360/15, 16, 17, 92, 94, 360/67

[56] References Cited
UNITED STATES PATENTS

| | | | |
|---|---|---|---|
| 2,528,279 | 10/1950 | Leedy | 360/15 |
| 2,622,155 | 12/1952 | Dutton | 360/15 |
| 3,072,753 | 1/1963 | Goldberg | 360/15 |
| 3,295,853 | 1/1967 | Cheng | 360/15 |
| 3,485,961 | 12/1969 | Lovick | 360/15 |
| 3,620,476 | 11/1971 | Cervantes | 360/15 |

Primary Examiner—Alfred H. Eddleman
Assistant Examiner—Jay P. Lucas
Attorney, Agent, or Firm—John Joseph Hall

[57] ABSTRACT

A tape duplicator having component parts capable of duplicating magnetic tape in cassette form or reel form to cassette form or reel form interchangeably without special units, having the same capstan drive to drive both the cassette and the reel tapes interchangeably, and provided with an automatic volume control which is fully compensated to adjust the volume level to the set level and which avoids excessive high volume levels in beginning recording and high noise levels during silent spots in the tapes.

2 Claims, 12 Drawing Figures

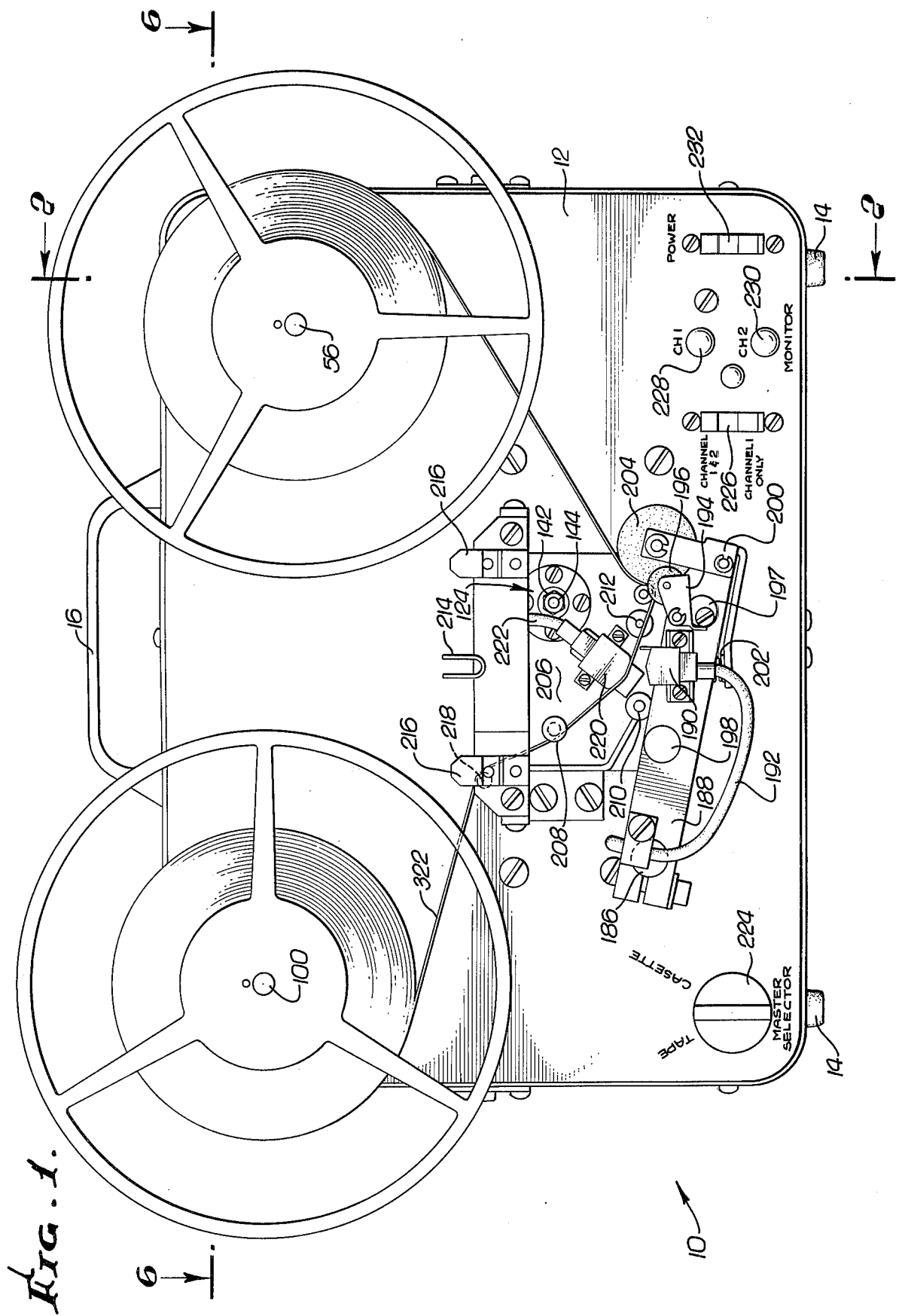

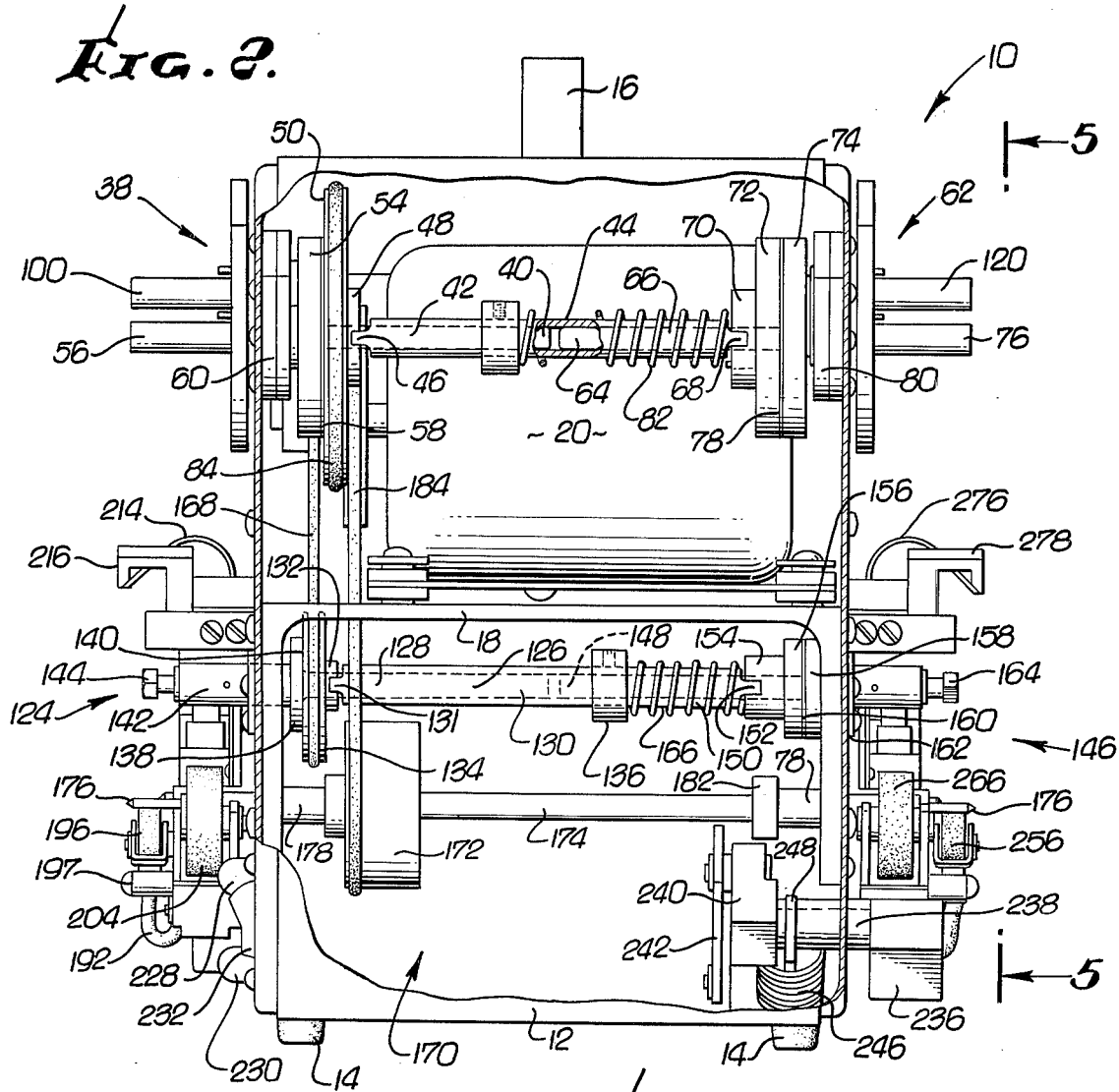
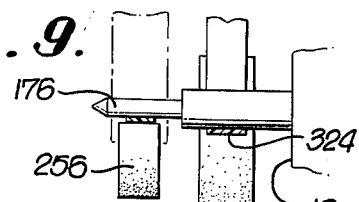
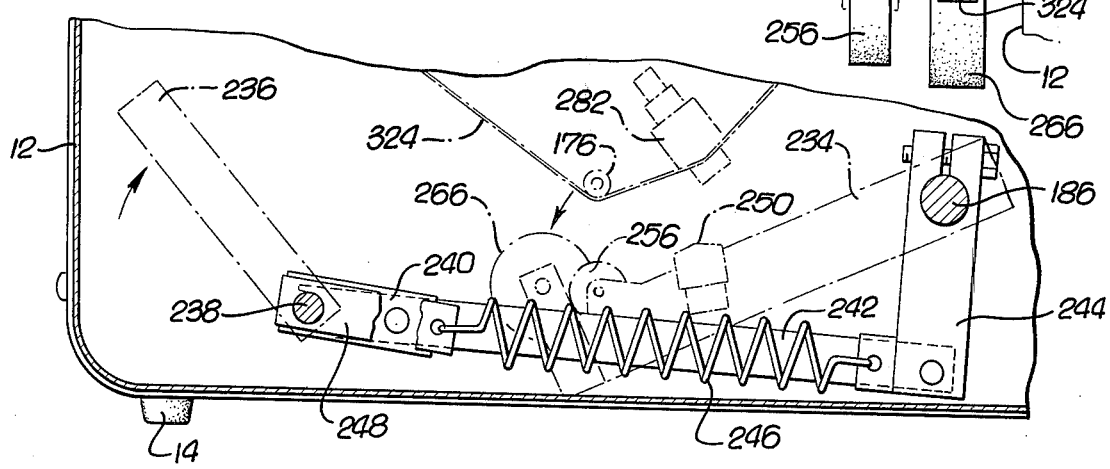

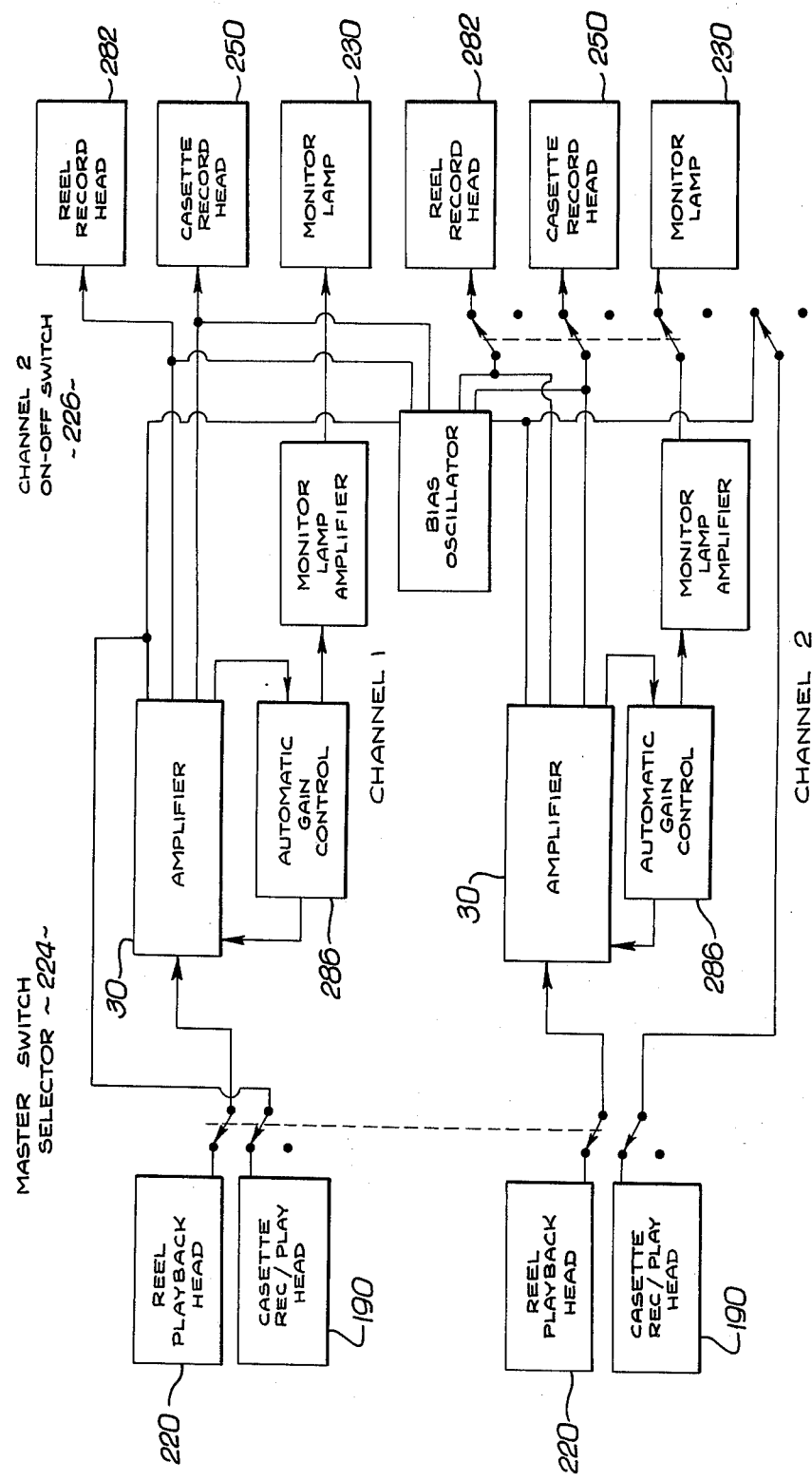

MULTI-FORMAT TAPE DUPLICATOR

BACKGROUND OF THE INVENTION

1. Field of the Invention.

This invention relates to a new and improved tape duplicator capable of duplicating tapes whether from reel to reel or cassette, or cassette to reel or cassette, interchangeably, using the same capstan drive, and having an improved automatic volume control which avoids excessive high recording volume levels and which fully compensates for various levels of volume of the various tapes to be duplicated.

2. Prior Art.

While various tape duplicating devices exist, applicant is unaware of the prior art devices having the particular capabilities of this invention in a single and compact unit and without special component parts or units being necessary.

SUMMARY OF THE INVENTION

This invention comprises a tape duplicator in a relatively compact form which is readily portable by a person. The tape duplicator has the unusual capability of duplicating tapes in cassettes or reels, onto cassettes or reels, interchangeably, as well as simultaneously. In so doing, the tape duplicator uses the same capstan drive to drive both the cassette and the reel tapes interchangeably, thereby reducing the number of component parts necessary to produce the capability of the tape duplicator.

Another feature of the invention is a new and improved circuit for automatic volume control. The circuit design provides for adjusting for the level of volume in the tapes to be duplicated to a pre-set record level, and fully compensates for different tapes. The automatic volume control circuit thus dispenses with the need to manually adjust the volume at which the tape to be duplicated will be played and to experiment to achieve the sound level desired, thus requiring the tape to be played first, then rewound, and played over for the duplicating process.

Moreover, conventional automatic volume circuits cause an excessively high recording volume initially because they are relatively slow in response and increase the volume of noise on silent portions of the tape. The improved circuit design here permits tape duplicating without high levels of volume at the time of initial input, as well as during silent portions of the tape.

It is, therefore, an object of this invention to provide a tape duplicator which can be used to duplicate a reel tape on a reel or a cassette tape, as well as duplicate a cassette tape on a reel or cassette tape, interchangeably.

Another object of this invention is to provide a tape duplicator which can be used to duplicate a master reel tape on a reel and a cassette tape simultaneously, as well as duplicate a master cassette tape on a reel tape and a cassette tape simultaneously.

Still another object of this invention is to provide a tape duplicator which can be used to duplicate a master reel tape on a reel tape and two cassette tapes simultaneously.

A further object of this invention is to provide interchangeable duplication of master tape recordings on cassette tapes or reel tapes by a unit which is relatively compact, portable, and without the need for bulky and intricate component accessories.

A yet further object of this invention is to provide duplication of master tape recordings whether cassette or reel tapes, simultaneously on both a cassette tape and a reel tape, by a unit which is relatively compact, portable, and without the need for bulky and intricate component accessories.

A yet further object of this invention is to provide a tape duplicator having an automatic volume control circuit which will adjust for the volume in the tapes to be duplicated to a preset volume level and fully compensates for various volume levels of various tapes to be duplicated.

A yet further object of this invention is to provide a tape duplicator having an automatic volume control circuit which avoids excessively high volume levels at the beginning of tape duplication as well as during silent periods during the duplication process.

These and other objects will be more readily understood by reference to the following description, taken in conjunction with the accompanying claims and drawings, in which FIG. 1 is an elevational side view of an embodiment of my invention showing the side on which a master tape may be placed for duplicating.

FIG. 2 is a section taken along line 2—2 of FIG. 1 without the reels of FIG. 1.

FIG. 8 is a fragmentary detail section of the view of FIG. 5 showing the linkage components in open position.

FIG. 9 is a section taken along line 9—9 of FIG. 5 through the capstan with a reel and cassette tape in section.

FIG. 12 is a block diagram of an embodiment of the electronic circuit for the tape duplicator.

Figure 3:
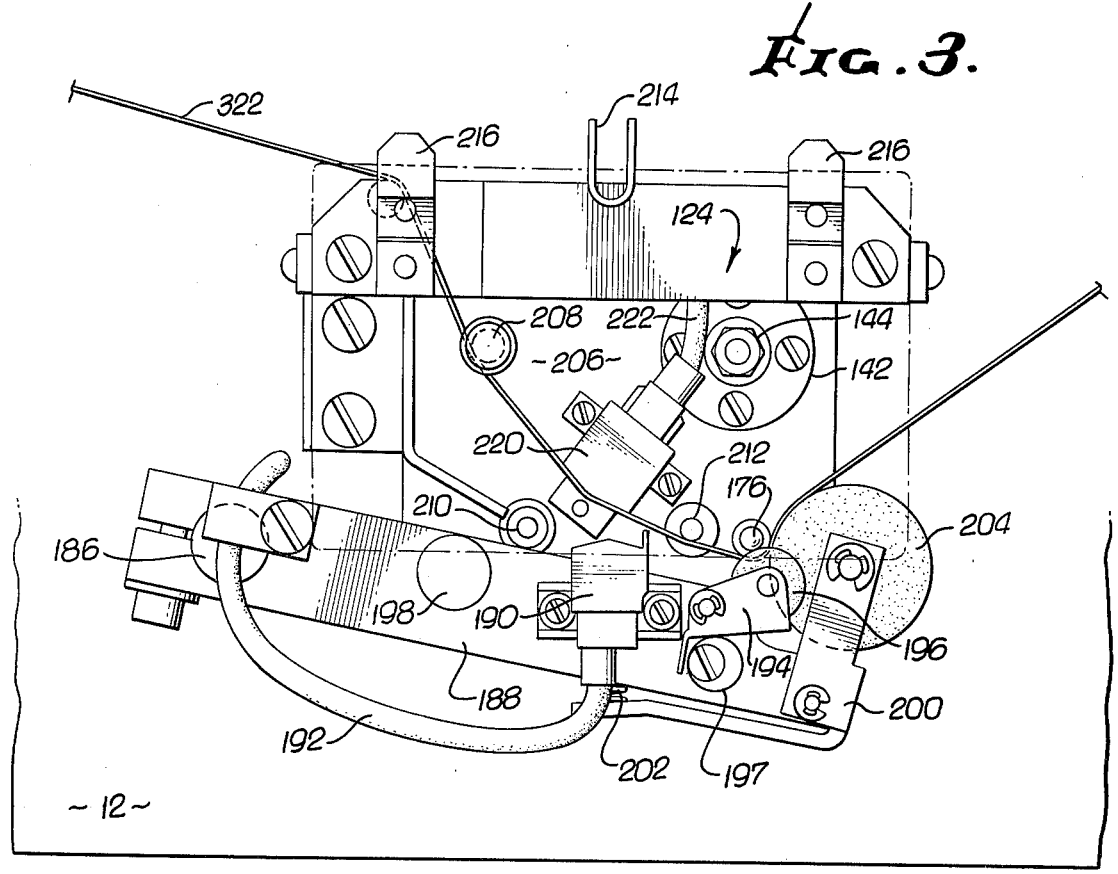
FIG. 3 is a detail section of the view of FIG. 1 in a closed position.
Figure 4:
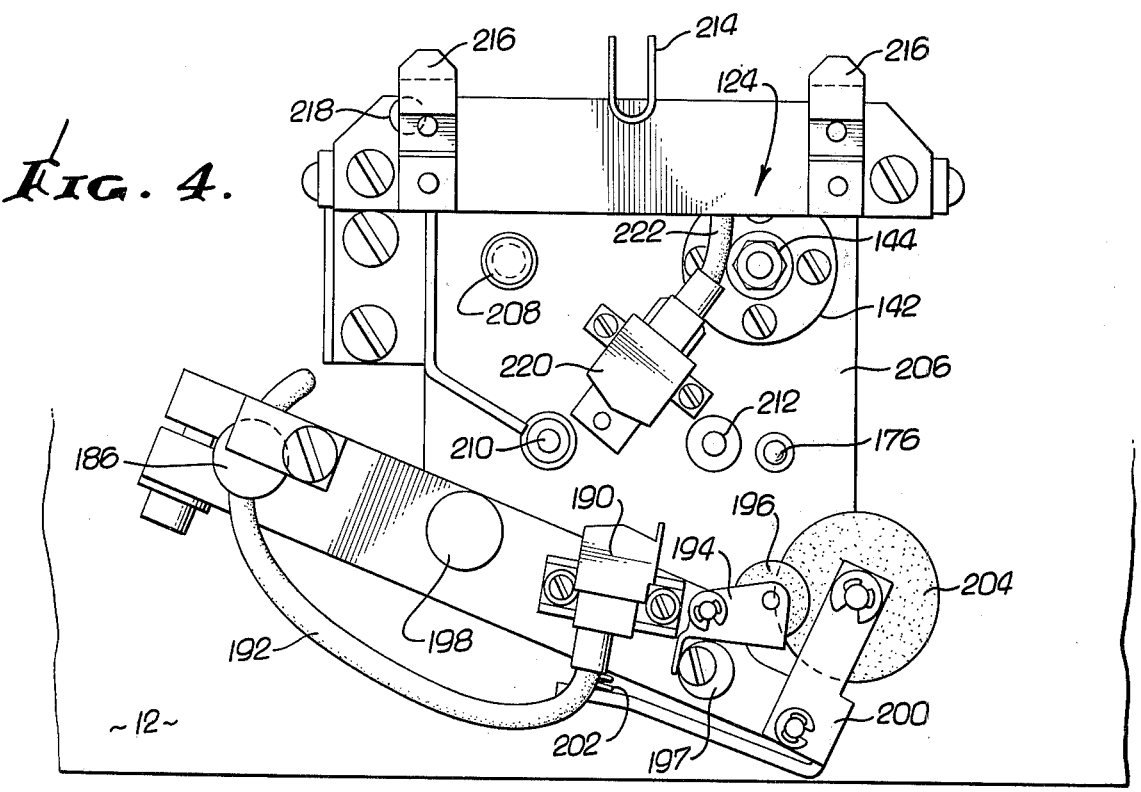
FIG. 4 is a detail section of the view of FIG. 1 in an open position.

With reference to the drawings, the tape duplicator 10 has a housing 12 supported on feet members 14 preferably made of a rubber or similar material. The housing 12 has a handle 16 formed at its top for easy movement of the tape duplicator 10. Frame 18 is secured to the cover 12 by any suitable means..

Motor 20 of the tape duplicator 10 is secured to frame 18 by motor mounts 22. Motor capacitor 24 is secured to frame 18 by screws or other suitable means. Transformer 26 for the power supply is also secured to frame 18 by screws or other suitable means.

Circuit board bracket 28 is secured by screws or other suitable means to housing 12. Amplifier boards 30 are fastened by screws or other suitable means to bracket 28.

Circuit board bracket 32 is secured by screws or other suitable means to housing 12 and supports bias oscillator board 34 and power supply board 36.

The master side of tape duplicator 10 has a master reel take-up and clutch assembly 38 provided with a master reel shaft 40 inserted into master end 42 of coupling 44. The tip of master end 42 of coupling 44 is formed into a tongue 46 which is inserted into a slot in hub portion 48 of reel take-up pulley 50. Coupling 44 has a collar 52 mounted at its master end 42.

Master disk 54 and master reel take-up hub 68 are each attached by set screw or other suitable means to the outer end portion of master reel shaft 40. Master outer disk 54 is provided with a felt pad 58 on its inner side. Master reel take-up bearing assembly 60 is located on master reel shaft 40 between master disk 54 and housing 12, and is attached to housing 12 by screws or other suitable means.

The copy side of tape duplicator 10 has a copy reel take-up and clutch assembly 62 provided with a copy reel shaft 64 inserted into the copy end 66 of coupling 44. The tip of end 66 is formed into a tongue 68 which is inserted into a slot in hub portion 70 of inner disk 72.

Copy outer disk 74 and copy reel take-up hub 76 are each attached by set screws or other suitable means to the outer end portion of copy reel shaft 64. Copy outer disk 74 is provided with a felt pad 78 on its inner side. Copy reel take-up bearing assembly 80 is located on copy reel shaft 64 between housing 12 and copy outer disk 74, and is attached to housing 12 by screws or other suitable means.

Spring 82 is placed around coupling 44 between collar 52 and the hub portion 70 of inner disk 72.

Reel take-up belt 84 connects reel take-up pulley 50 to motor 20.

The master side of tape duplicator 10 is provided with a master brake assembly 86 having a master brake wheel 88 attached to master reel supply shaft 90. Master brake cord 92 is wrapped around master brake wheel 88 and is attached to circuit board bracket 28 by a screw 94 or other suitable means. Master brake spring 96 is attached at one end to circuit board bracket 28 and at its other end to master brake cord 92.

Master reel supply bearing assembly 98 is located on master reel supply shaft 90 between master brake wheel 88 and housing 12, and is attached to housing 12 by screws or other suitable means. Master reel supply hub 100 is attached by set screws or other suitable means to the outer end portion of master reel supply shaft 90.

Similarly, the copy side of tape duplicator 10 is provided with a copy brake assembly 102 having a copy brake wheel 104 attached to copy reel supply shaft 106. Copy brake cord 108 is wrapped around copy brake wheel 104 and is attached to circuit board bracket 28 by a screw 112 or other suitable means. Copy brake spring 114 is attached at one end to circuit board bracket 28 and at its other end to copy brake cord 108.

Copy reel supply bearing assembly 116 is located on copy reel supply shaft 106 between copy brake wheel 104 and housing 12, and is attached to housing 12 by screws or other suitable means. Copy reel supply hub 120 is attached by screws or other suitable means to the outer end portion of copy reel supply shaft 106.

Tube 122 receives and supports master reel supply shaft 90 and copy reel supply shaft 106.

The master side of tape duplicator 10 has a master cassette take-up and clutch assembly 124 provided with a master cassette shaft 126 inserted into the master end 128 of coupling 130. The tip of end 128 is formed into a tongue 131 which is inserted into a slot in hub portion 132 of cassette take-up pulley 134. Coupling 130 has a collar 136 mounted around it by a screw or other suitable means.

Master cassette disk 138 is attached by a set screw or other suitable means to the outer end portion of master cassette shaft 126. Master cassette disk 138 has a felt pad 140 on its inner side. Master cassette take-up bearing assembly 142 is located on master cassette shaft 126 at its outer end and is attached to master mounting plate 206 by screws or other suitable means. Master cassette take-up hub 144 is attached to master cassette shaft 126.

The copy side of tape duplicator 10 has a copy cassette take-up and clutch assembly 146 provided with a copy cassette shaft 148 inserted into the copy end 150 of coupling 130. The tip of end 150 is formed into a tongue 152 which is inserted into a slot in hub portion 154 of cassette inner disk 156. Copy cassette outer disk 158 is provided with a felt pad 160 on its inner surface and is attached by a set screw or other suitable means to a copy cassette shaft 148. Copy cassette take-up bearing assembly 162 is located on copy cassette shaft 148 at its outer end and is attached to copy mounting plate 268 by screws or other suitable means. Copy cassette take-up hub 164 is attached to copy cassette shaft 148.

Spring 166 is placed around coupling 130 between collar 136 and the hub portion of cassette inner disk 156.

Cassette take-up belt 168 connects cassette take-up pulley 134 to motor 20.

Capstan assembly 170 has a capstan pulley 192 attached by a set screw to capstan 174 which has two different diameters, a reduced diameter 176 being located at each of its ends extending outside housing 12. Spacers 178 are located at each end of the larger diameter portion 180 of capstan 174 within frame 18. Capstan collar 182 maintains capstan 174 in position. Capstan belt 184 connects capstan pulley 172 to motor 20.

The master end of mounting arm shaft 186 extends through housing 12 and is connected to master mounting arm 188 on the master side of tape duplicator 10. Master cassette playback head 190 is mounted on master mounting arm 188. Lead wire 192 connects head 190 to the master selector switch 224.

Master cassette pinch roller arm 194 is mounted and spring loaded on master mounting arm 188 and has master cassette pinch roller 196 rotatably mounted on it. One end of master cassette pinch roller arm 194 bears against adjustment screw 197 which functions as a stop. Master cassette tape guide 198 is also mounted on master mounting arm 188.

Master reel pinch roller arm 200 is pivotally mounted on master mounting arm 188 and has a spring 202 connecting one of its ends to the bottom of master mounting arm 188. Master reel pinch roller 204 is rotatably mounted to the other end of master reel pinch roller arm 200.

Master mounting plate 206 is secured by any suitable means to the outside of housing 12. Master reel tape guide 208 is set on master mounting plate 206 and serves also as a master cassette supply post. Master cassette alignment pin 210 is also set on master mounting plate 206 and serves also as a stop for master mounting arm 188. Master cassette alignment pin 212 serves also as a master reel tape guide.

Master cassette clamp spring 214 is attached to master mounting plate 206 by any suitable means. Master cassette guides 216 are mounted to master mounting plate 206 by any suitable means. Master reel guide post 218 is mounted on mounting plate 206 by any suitable means. Reel playback head 220 is also mounted on master mounting plate 206 and is connected by lead wire 222 to amplifier boards 30.

The master side of tape duplicator 10 has a master selector switch 224, channel selector switch 226, monitor light 228 for channel 1, and monitor light 230 for channel 2, and power switch 232.

The copy end of mounting arm shaft 186 extends through housing 12 and is connected to copy mounting arm 234 on the copy side of tape duplicator 10.

The copy side of tape duplicator 10 has an outside operating lever 236 rigidly mounted on operating lever shaft 238. Internal front arm 240 is rigidly connected to operating lever shaft 238 and pivotally connected to one end of connecting link 242. Operating lever shaft 238 is pivotally mounted in housing 12. The other end of connecting link 242 is pivotally connected to internal rear arm 244. Internal operating spring 246 has one of its ends connected to internal rear arm 244 and the other end connected to one end of anchor link 248. The other end of anchor link 248 is pivotally mounted on operating lever shaft 238.

Copy cassette recording head 250 is mounted on copy mounting arm 234. Lead wire 252 connects recording head 250 to the output of the bias oscillator board 34.

Copy cassette pinch roller arm 254 is mounted and spring loaded on copy mounting arm 234 and has copy cassette pinch roller 256 rotatably mounted on it. One end of copy cassette pinch roller arm 254 bears against adjustment screw 258 which is also used as an overtravel stop. Copy cassette tape guide 260 is also mounted on copy mounting arm 234.

Copy reel pinch roller arm 262 is pivotally mounted on copy mounting arm 234 and has a spring 264 connecting one of its ends to the bottom of copy mounting arm 234. Copy reel pinch roller 266 is rotatably mounted to the other end of copy reel pinch roller arm 262.

Copy mounting plate 268 is secured by any suitable means to the outside of housing 12. Copy reel tape guide 270 is set on copy mounting plate 268 and serves also as a copy cassette supply post. Copy cassette alignment pin 272 is also set on copy mounting plate 268 and serves also as a stop for copy mounting arm 234. Copy cassette alignment pin 274 serves also as a copy reel tape guide.

Copy cassette clamp spring 276 is attached to copy mounting plate 268 by any suitable means. Copy cassette guides 278 are mounted to copy mounting plate 268 by any suitable means. Copy reel guide post 280 is mounted on copy mounting plate 268 by any suitable means.

Reel recording head 282 is mounted on copy mounting plate 268 and is connected by lead wire 284 to the output of the bias oscillator board 34.

Figure 10:
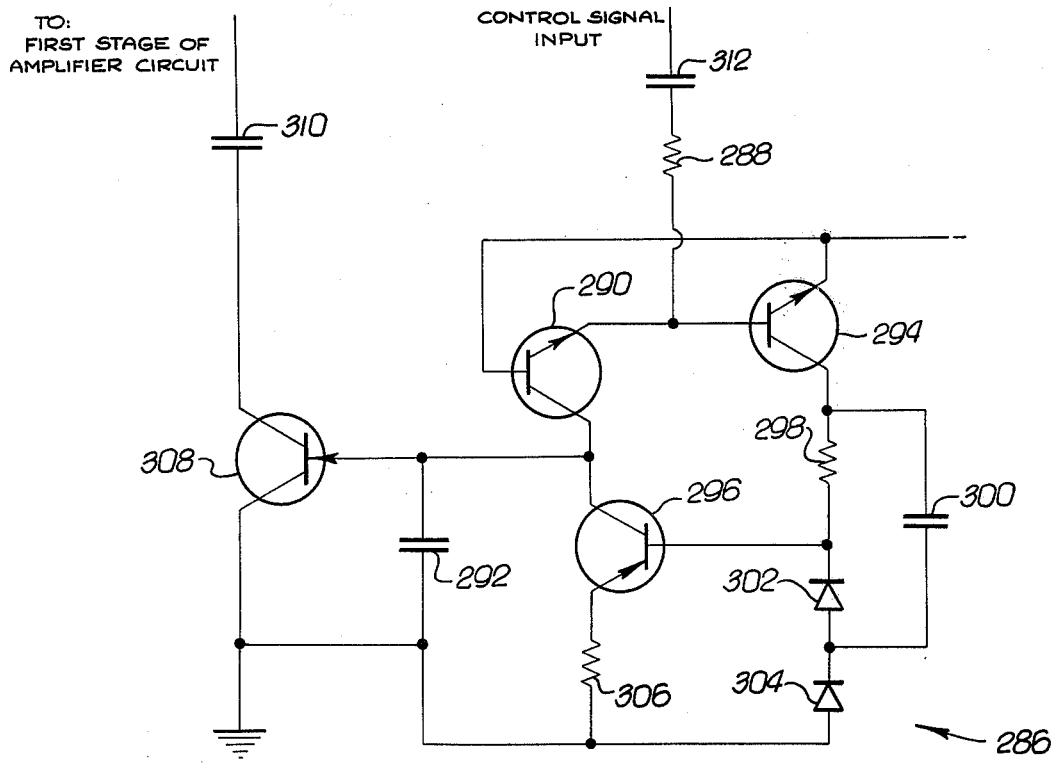
FIG. 10 is a circuit diagram of an embodiment of the automatic volume control circuit.

The amplifiers of amplifier boards 30 are each provided with an improved circuit 286 for automatic volume control, as shown in the diagram of FIG. 10. Resistor 288 is used as a current limiter so current through it is proportional to input voltage. On a negative swing of the input, resistor 288 drives transistor 290 which has unitary current gain and is used to charge control capacitor 292.

On a positive swing of the input, resistor 288 drives transistor 294 which is connected up as both a current and voltage amplifier. Transistor 294 is coupled up with transistor 296 through a filter network of resistor 298 and capacitor 300.

The output from the filter network drives transistor 296 in conjunction with diodes 302 and 304. Resistor 306 provides a constant current source to discharge capacitor 292. The charge on capacitor 292 provides the voltage for field effect transistor 308. The resistance of field effect transistor 308 is determined by its reverse bias voltage.

Circuit 286 is provided with a coupling capacitor 310, which is coupled to the emitter of the first transistor in the first stage of the audio amplifier circuit (not shown). Field effect transistor 308 functions as a variable resistor in the audio amplifier circuit. Another coupling capacitor 312 couples the output of the amplifier of amplifier boards 30 to circuit 286.

Figure 11:
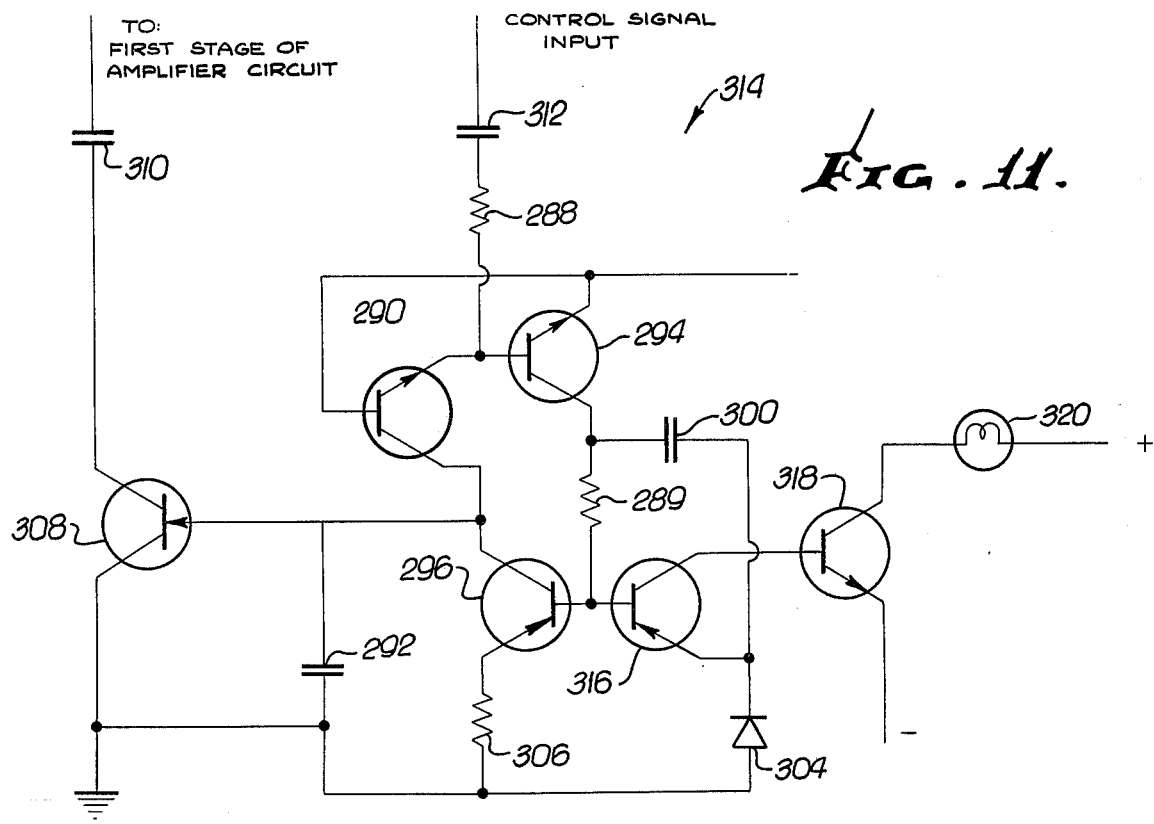
FIG. 11 is another circuit diagram of another embodiment of the automatic volume control circuit.

If desired, a lamp may be added to circuit 286 which is then modified as shown in FIG. 11. In the circuit 314 of FIG. 11, a transistor 316 replaces diode 302 and a transistor 318 is added to form lamp driver circuit to drive lamp 320.

As shown in FIG. 12, the master cassette playback head 190 may have an additional function of operating as a recording head. Thus, it is possible to duplicate a master reel tape on two blank cassettes as well as on a blank reel tape. Also, the tape duplicator provides a means for switching off channel 2 for duplicating one or two tracks of a master tape as desired.

In operation, the tape duplicator 10 provides high speed duplication of audio tapes, 15 ips for cassette tapes, and 30 ips for reel tapes through the ratio of capstan pulley 172 to the drive of motor 20 in conjunction with the different diameters of the capstan 174. This ratio produces an increase in speed of 8 times the usual 1⅞ ips speed of cassette tapes and 8 times the usual 3¾ speed of reel tape. The capstan 174 has a ¼ inch diameter to produce the 30 ips speed for reel tapes, and a reduced ⅛ inch diameter at its ends to produce the 15 ips speed for cassette tapes.

The tape duplicator 10 is normally used for two track monophonic tapes, although it can be modified for four track stereo or other track configurations.

Figure 5:
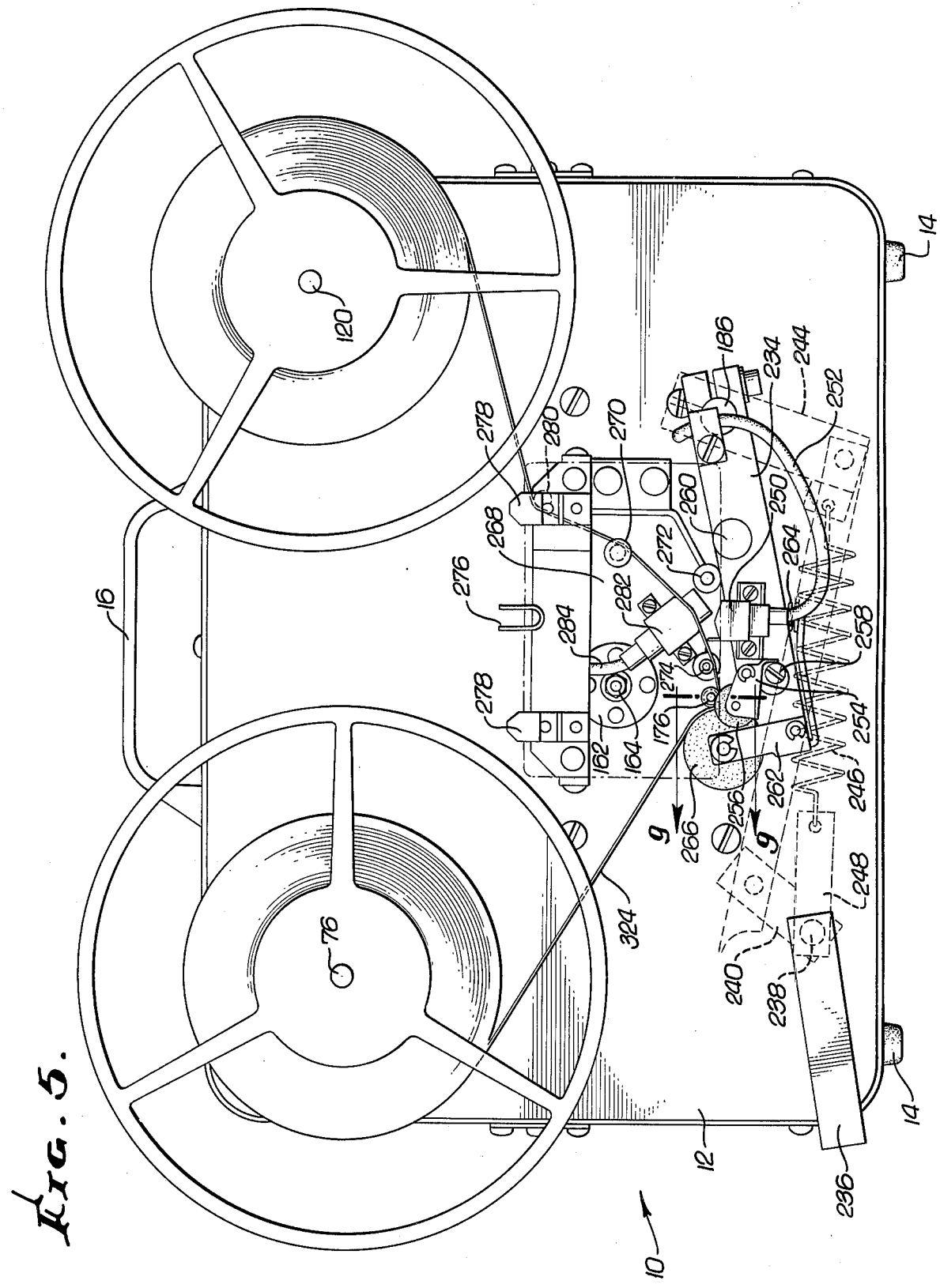
FIG. 5 is a side elevational view of the copy side, opposite to that of FIG. 1, with reels and cassette in phantom lines.
Figure 6:
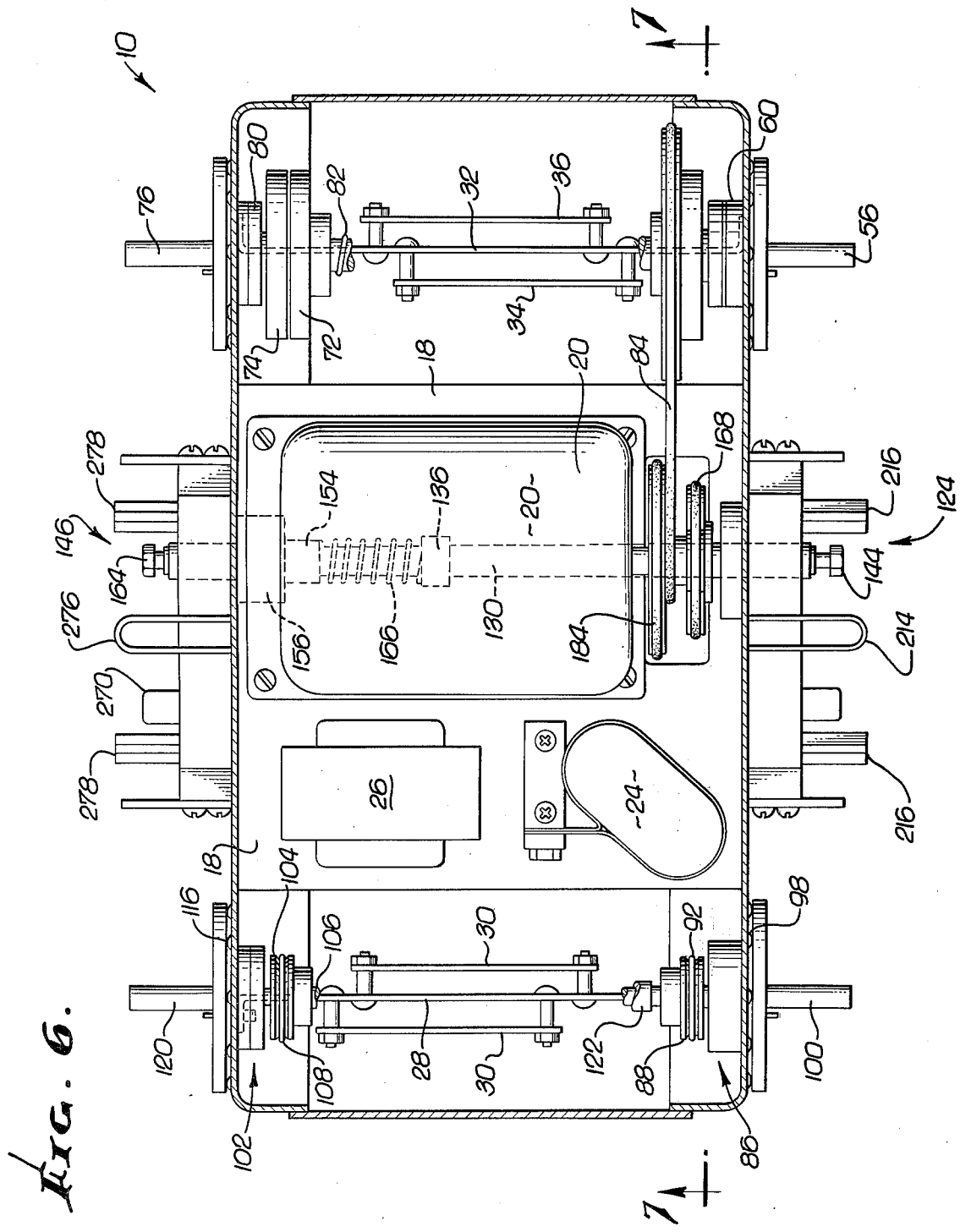
FIG. 6 is a section taken along line 6—6 of FIG. 1 without the reels of FIG. 1.
Figure 7:
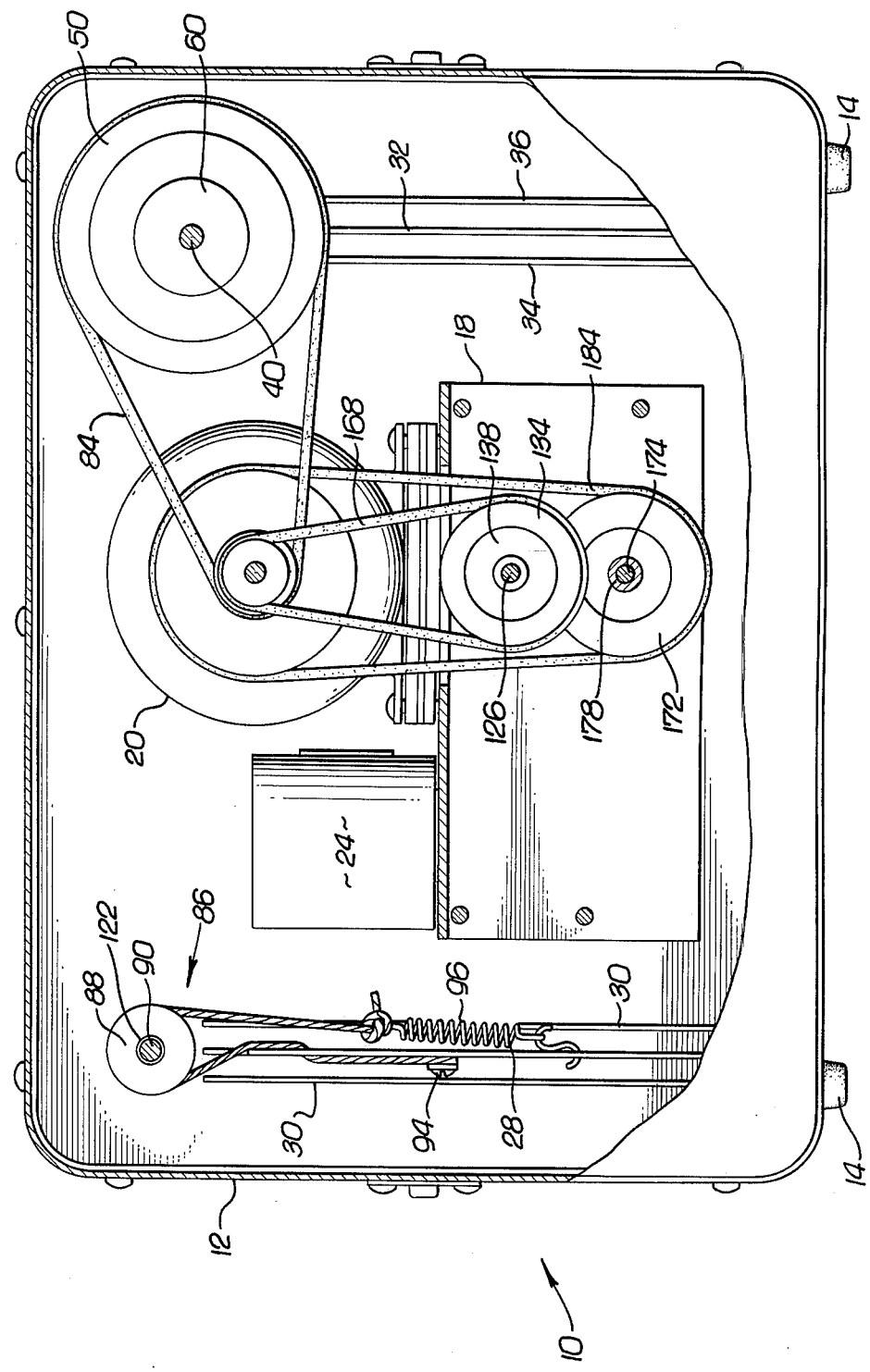
FIG. 7 is a section taken along line 7—7 of FIG. 6.

A master tape, reel or cassette, is placed on the master side of tape duplicator 10. Thus, for example, a master reel tape 322 is shown in phantom lines in FIG. 1. A blank copy reel tape 324 is loaded on the copy side of tape duplicator 10, as shown in FIG. 5. If a simultaneous duplication of a blank cassette tape is desired, a blank cassette is also loaded on the copy side of tape duplicator 10. Also, if a second simultaneous duplication of a cassette is desired, a second blank cassette is loaded on the master side of tape duplicator 10.

Operating lever 236 is then pushed downwards from the open position shown in FIG. 8 of the drawings to the closed position shown in FIG. 5 of the drawings. In the closed position of operating lever 236, master mounting arm 188 and copy mounting arm 234 are each rotated to an up position by mounting arm shaft 186 so that master and copy reel pinch rollers 204 and 266, master and copy cassette pinch rollers 196 and 256, master and copy cassette guides 198 and 260, cassette recording heads 190 and 250, are each in engaged position as shown in FIGS. 3 and 5. Master selector switch 224 is then set in the master reel position. If it is desired to record both tracks 1 and 2 of the master tape 322, then the track switch 226 is set to channels 1 and 2. Power switch 232 is then turned on, energizing motor 20 from a suitable power source (not shown).

Capstan 174 then advances the cassette tapes at a uniform speed of 15 ips and the reel tapes at a uniform speed of 30 ips, both speeds being produced simultaneously, due to the different diameters of capstan 174. Brake assemblies 86 apply tension to the reel tapes. Master and copy reel take-up and clutch assemblies 38 and 64 provide constant torque on the reel tapes, while master and copy cassette take-up and clutch assemblies 124 and 146 provide constant torque on the cassette tapes.

Reel playback head 220 converts the magnetic pulses on the master reel tape 322 to electrical signals which pass through amplifiers of amplifier boards 30 and through the automatic volume control circuits 286, or the modified form of 314, as the case may be, to cassette and reel tape recording heads 190, 250 and 282, for simultaneous recording on the two copy cassette tapes and the copy reel tape.

Bias oscillator 34 generates an ultrasonic bias signal which is added to the audio output from amplifier boards 30. The combined signals simultaneously drive reel and cassette recording heads 282, 190 and 250.

In operation, the output of the amplifiers of amplifier boards 30 drives the automatic volume control circuits 286, or 314, as the case may be. When the output is sufficient to overcome the base-emitter voltage of input transistors 294 and 290, they begin to conduct. Transistor 290 tends to charge capacitor 292 which controls the bias voltage on field-effect transistor 308 which in turn controls the gain of the amplifier. The charge rate is a function of the amplifier output voltage. Transistor 294 drives a constant current circuit, and in the modified form of circuit 286, a lamp 204 for monitor lights.

The constant current tends to discharge capacitor 292 which controls field-effect transistor 308, which in turn controls the gain of the amplifiers. If the audio output level is too high or too low, the predominance of the charge or discharge current will tend to restore the proper audio output level. For normal audio output levels, the charge and discharge currents will balance.

If the audio output is insufficient to overcome the base-emitter voltage of transistors 294 and 290, the charge on the control capacitor 292 remains the same. Thus, where there is insufficient control signal input, the effect will be to shut off transistors 290 and 296, there will be no current flow, and the charge will remain constant and will be maintained at that level until the next signal input.

The circuits 286 and 314 each have very fast response to rapidly decrease the amplifier gain to prevent excessively high recording level on duplicate tapes. This is particularly important at the beginning of the duplicating process, because the automatic volume control circuit always starts with maximum gain. Ordinary fast response systems tends towards instability or "hunting" since they continuously increase the amplifier gain during silent portions on the tape to be duplicated. Upon receipt of the next signal, the amplifier gain is too high and must be reduced; thus, the amplifier gain is always changing or hunting. The automatic volume control circuit 286 prevents hunting by switching to a passive or "memory" mode during silent portions on the tape to be duplicated wherein the amplifier gain remains constant. The automatic volume control circuit 286 immediately and rapidly responds to maintain the proper recording level of the tapes.

Although I have described the invention in detail with reference to the accompanying drawings illustrating preferred embodiments of the invention in conjunction with the specification, it is understood that numerous changes in the details of construction and arrangement of parts and components may be made without departing from the spirit and scope of the invention as hereinafter claimed.

I claim:

1. A tape duplicator capable of duplicating master tape in reel form as well as in cassette form onto a blank cassette tape and a blank reel tape simultaneously at relatively high speeds, comprising:

single drive means for advancing said tapes over a playback head and recording heads, respectively;

single capstan means having different diameters for producing a different speed for said cassette tape from the speed for said reel tape;

audio amplifier means connected between said playback head and said recording heads, said audio amplifier means having an automatic volume control circuit comprising:

input transistor means having a pre-determined base-emitter voltage;

circuit means for providing a pre-determined volume level on said blank tapes for duplicating a master tape whose recorded volume level is below said pre-determined volume level and for duplicating a master tape whose recorded volume level is above said pre-determined volume level; and circuit means including a field effect transistor for maintaining constant amplifier gain while the signal input to said automatic volume control circuit remains insufficient to overcome said pre-determined base-emitter voltage of said input transistor means, thereby preventing a change in the amplifier gain until after receipt of a signal input sufficient to overcome said pre-determined base-emitter voltage of said input transistor means, whereby all of said tapes move simultaneously and in synchronization at all times.

2. A tape duplicator capable of duplicating a master reel tape simultaneously onto two blank cassette tapes and a blank reel tape at relatively high speeds, comprising:

single drive means for advancing said tapes over a reel playback head and two cassette recording heads and a reel recording head, respectively;

single capstan means having different diameters for producing a different recording speed for said blank cassette tapes from the recording speed for said blank reel tape;

audio amplifier means connected between said playback head and said recording heads, said audio amplifier means having an automatic volume control circuit comprising:

input transistor means having a pre-determined base-emitter voltage;

circuit means for providing a pre-determined volume level on said blank tapes for duplicating a master tape whose recorded volume level is below said pre-determined volume level and for duplicating a master tape whose recorded volume level is above said pre-determined volume level; and circuit means including a field effect transistor for maintaining constant amplifier gain while the signal input to said automatic volume control circuit remains insufficient to overcome said pre-determined base-emitter voltage of said input transistor means, thereby preventing a change in the amplifier gain until after receipt of a signal input sufficient to overcome said pre-determined base-emitter voltage of said input transistor means, whereby all of said tapes move simultaneously and in synchronization at all times.

* * * * *